United States Patent
Zhang et al.

(10) Patent No.: US 9,458,325 B2
(45) Date of Patent: Oct. 4, 2016

(54) GRAPHENE AND FLUORPOLYMER COMPOSITE

(71) Applicant: XEROX CORPORATION, Norwalk, CT (US)

(72) Inventors: Qi Zhang, Milton (CA); Yu Qi, Oakville (CA); Brynn Dooley, Toronto (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 456 days.

(21) Appl. No.: 14/044,446

(22) Filed: Oct. 2, 2013

(65) Prior Publication Data

US 2015/0093584 A1    Apr. 2, 2015

(51) Int. Cl.

| | |
|---|---|
| *C08K 9/02* | (2006.01) |
| *C09C 1/00* | (2006.01) |
| *C09C 1/44* | (2006.01) |
| *C08K 9/06* | (2006.01) |
| *C08K 3/04* | (2006.01) |
| *C08J 3/12* | (2006.01) |
| *C09D 127/18* | (2006.01) |
| *C08K 5/54* | (2006.01) |
| *B32B 9/00* | (2006.01) |
| *B32B 19/04* | (2006.01) |
| *B32B 19/00* | (2006.01) |
| *B32B 27/14* | (2006.01) |

(52) U.S. Cl.
CPC .............. *C09C 1/0081* (2013.01); *C08J 3/128* (2013.01); *C08K 3/04* (2013.01); *C08K 9/06* (2013.01); *C09C 1/44* (2013.01); *C09D 127/18* (2013.01); *B32B 9/007* (2013.01); *B32B 19/00* (2013.01); *B32B 19/043* (2013.01); *B32B 19/045* (2013.01); *B32B 27/14* (2013.01); *B32B 2264/0257* (2013.01); *B32B 2264/108* (2013.01); *B32B 2305/30* (2013.01); *B32B 2307/746* (2013.01); *B32B 2307/748* (2013.01); *C08J 2327/12* (2013.01); *C08K 5/5406* (2013.01); *Y10T 428/31663* (2015.04)

(58) Field of Classification Search
None
See application file for complete search history.

(56) References Cited

U.S. PATENT DOCUMENTS

| | | | |
|---|---|---|---|
| 7,312,011 B2 | 12/2007 | Patel et al. | |
| 8,173,337 B2 | 5/2012 | Kelly et al. | |

FOREIGN PATENT DOCUMENTS

CN    102701191 A  * 10/2012

OTHER PUBLICATIONS

Kandanur et al., "Suppression of wear in graphene polymer composites", Carbon, 2011, pp. 1-6.
Author Unknown, Graphene Nanoplatelets, STREM, pp. 1-2.

* cited by examiner

*Primary Examiner* — Marc Zimmer
(74) *Attorney, Agent, or Firm* — MH2 Technology Law Group LLP (57) ABSTRACT

A composition comprises a liquid continuous phase and a plurality of composite particles dispersed therein. The composite particles each comprise a fluorosilane-treated graphene-comprising particle and a fluoropolymer particle.

20 Claims, 4 Drawing Sheets

GRAPHENE AND FLUORPOLYMER COMPOSITE

DETAILED DESCRIPTION

1. Field of the Disclosure

The present disclosure is directed to a graphene-comprising particle and fluoropolymer particle composite material and articles of manufacture comprising the composite material.

2. Background

Fluoropolymers are employed in a wide variety of applications. Examples include hydrophobic coatings for anti-contamination, anti-sticking and self-cleaning surfaces; chemically resistant and/or thermally stabile plastic or elastic components in consumer and industrial applications; lubricating and/or protective coatings; xerographic components, such as outer release coatings for fusers, as well as a variety of other applications. Fluorpolymer materials, such as PFA and PTFE fluoroplastics, are often applied in the form of dispersed particles.

Another nano-particle material that has recently garnered significant attention is graphene. Graphene is often described as a two dimensional sheet of sp2 bonded carbon atoms arranged in a hexagonal lattice. Due to unique structural features, graphene possesses superior thermal and electrical conductivity, as well as high mechanical strength. Incorporation of graphene into fluoroplastics can improve thermal and/or electrical conductivity and mechanical robustness of the resulting composite material. Both individual graphene sheets and graphene platelets, which include a plurality of graphene layers, show enormous potential as fillers for composite applications.

However, it is challenging to make uniform, well-dispersed graphene composite materials with fluoroplastics. This is due, in part, to properties of graphene in nano-particle form and/or graphene's general incompatibility with fluoropolymers. Phase separations and graphene agglomerations are often associated with poorly dispersed composites, which hinder full utilization of the unique properties of graphene.

Discovering a novel fluoropolymer composite material that can address one or more of the problems associated with the known fluoropolymer graphene composites would be a desirable step forward in the art.

SUMMARY

An embodiment of the present disclosure is directed to a composition. The composition comprises a liquid continuous phase. A plurality of composite particles are dispersed in the liquid continuous phase. The composite particles each comprise a fluorosilane-treated graphene-comprising particle and a fluoropolymer particle.

Another embodiment of the present disclosure is directed to a process for making a fluorosilane-treated graphene/fluorocarbon polymer composite. The process comprises mixing graphene-comprising particles, a fluorosilane compound and a first liquid continuous phase to form a fluorosilane-treated graphene-comprising particle dispersion. The fluorosilane-treated graphene-comprising particles are mixed with a fluorocarbon polymer dispersion to form a dispersion of composite particles. The composite particles comprise fluorosilane-treated graphene-comprising particles adhered to fluorocarbon polymer particles. The composite particles are dispersed in a second liquid continuous phase.

Yet another embodiment of the present disclosure is directed to an article. The article comprises a substrate. A composite layer is formed on the substrate. The composite layer comprises a plurality of fluorosilane-treated graphene-comprising particles and a fluorocarbon polymer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

Process for making a Fluorosilane-Treated, Graphene-Comprising Particle/Fluorocarbon Polymer Composite An embodiment of the present disclosure is directed to a process for making a composite. The composite includes fluorosilane-treated graphene-comprising particles and a fluorocarbon polymer. The process comprises mixing graphene-comprising particles, a fluorosilane compound and a first liquid continuous phase to form a fluorosilane-treated graphene-comprising particle dispersion. The fluorosilane-treated graphene-comprising particle dispersion is then mixed with a fluorocarbon polymer particle dispersion comprising a second liquid continuous phase. The fluorosilane-treated graphene-comprising particles adhere to the fluorocarbon polymer particles to form composite particles.

Graphene-Comprising Particles

Any suitable graphene-comprising particles can be employed in the composites of the present disclosure. In an embodiment, the graphene-comprising particles can include graphene, graphene platelets and mixtures thereof. Graphene platelets are unique nanoparticles comprising short stacks of graphene sheets. They can have an average thickness of, for example, approximately 6 nm to approximately 8 nm. In an embodiment, they can have a relatively large per unit surface area, such as, for example, about 120 to 150 m$^2$/g. Such graphene-comprising particles are well known in the art.

Graphene-comprising particles can be present in the composite in any desired amount. Examples include amounts less than about 90 weight %, based on the total weight of the composition, such as about 1 weight % to about 50 weight %, or about 2 weight % to about 10 weight %.

Fluorosilane Compounds

Figure 1A:
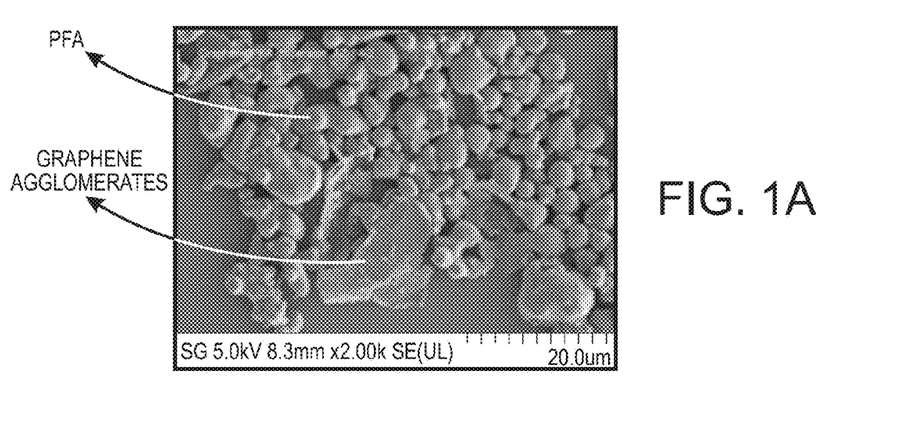
FIGS. 1A to 1C show photographs of graphene/PFA dispersion and coatings in which the graphene is not treated with fluorosilane.
Figure 1B:
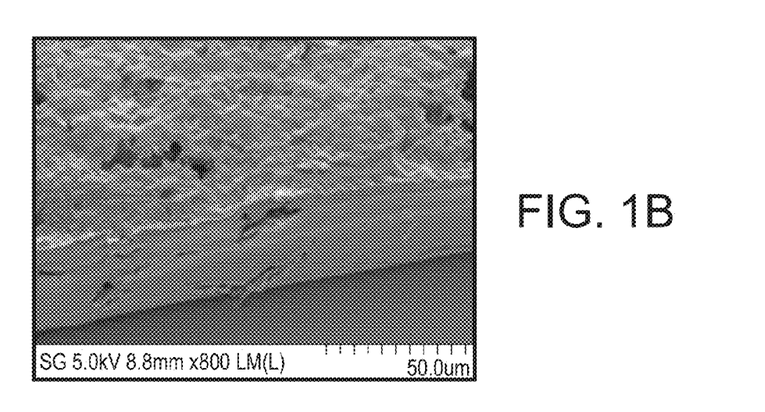
Figure 1C:
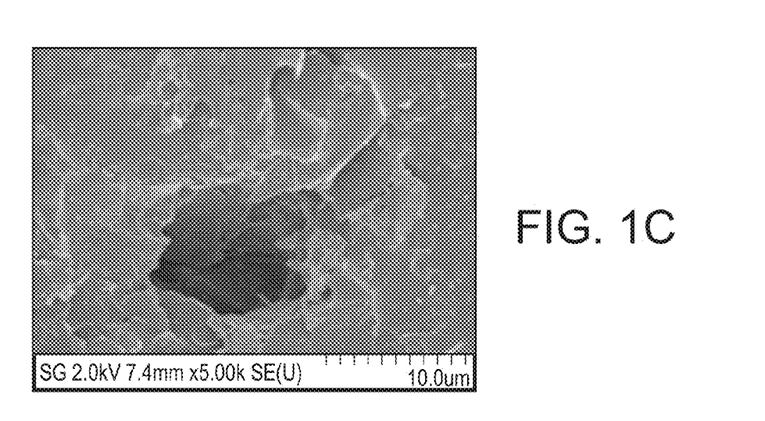

As described above, it is challenging to make uniform composite materials having well-dispersed graphene in fluoropolymers, such as fluoroplastics, due to graphene's nano-size material nature and general incompatibility with fluoropolymers. By sonication, graphene-comprising particles can be dispersed to a certain extent into a liquid continuous phase that is used for a flow-coatable fluoropolymer formulation. However, phase separation can be a problem when mixing the graphene dispersion with the flow-coatable fluoropolymer formulation. For example, graphene platelets tend to agglomerate together (irregular chunky plates) and separate out from PFA particles (round and smooth particles), as can be seen in FIG. 1A. The composite coatings made from one such dispersion showed undesirable large voids with agglomerates of graphene platelets, as shown in FIGS. 1B and 1C.

To address the problems of combining graphene and fluoropolymers, graphene-comprising particles of the present disclosure are treated with a fluorosilane to increase affinity with fluoropolymer particles. The treatment can be carried out in any desired manner. In an embodiment, the graphene-comprising particles are exfoliated by, for example, sonication of graphene in a first liquid continuous phase comprising one or more fluorosilane compounds to provide a generally uniform graphene dispersion containing the fluorosilane. Any other suitable method for exfoliating the graphene-comprising particles can be used in place of, or in addition to, sonication.

Any fluorosilanes that can provide an improvement in the graphene dispersion compared to untreated graphene, and which will not have a serious negative impact on subsequent processing steps, can potentially be used. Examples of fluorosilanes include compounds comprising C$_3$-C$_{16}$ fluorocarbon chain substituents, such as (3,3,3-trifluoropropyl) trichlorosilane, nonafluorohexyl trichlorosilane, nonafluorohexyl trimethoxysilane, pentafluorophenylpropyl trichlorosilane, (tridecafluoro-1,1,2,2-tetra-hydrooctyl) trichlorosilane), pentafluorophenylpropyl trialkoxysilanes, such as pentafluorophenylpropyl trimethoxysilane or pentafluorophenylpropyl triethoxysilane, perfluoroalkylethyltriethoxysilanes, perfluorododecyl-1H,1H,2H,2H-triethoxysilane, (tridecafluoro-1,1,2,2-tetra-hydrooctyl) trialkoxysilanes, such as (tridecafluoro-1,1,2,2-tetrahydrooctyl)triethoxysilane and (tridecafluoro-1,1,2,2-tetrahydrooctyl)trimethoxylsilane, and p-trifluoromethyltetrafluorophenyltriethoxysilane.

In an embodiment, the fluorosilane is a fluoroalkyl substituted trichlorosilane. In an embodiment, the fluoroalkyl substituent includes at least 5 or more carbon atoms substituted with fluorine. Examples include fluoroalkyl chains in which 6 or more of the carbon atoms, such as 6 to 10 or 12 of the carbon atoms, have carbon-fluorine bonds instead of carbon-hydrogen bonds. In an embodiment, the fluoroalkyl substituent is a linear carbon chain. If desired, the fluoroalkyl group can include some carbon atoms that are not substituted with fluorine. An example of a trichlorosilane with a linear fluoroalkyl group comprising 6 carbons with fluorine bonding is (tridecafluoro-1,1,2,2-tetra-hydrooctyl) trichlorosilane. Any other fluorosilanes that can provide a stable graphene-fluoropolymer dispersion can also be used.

Liquid Continuous Phase

The graphene-comprising particles and fluorosilane compounds are mixed in a first liquid continuous phase. Any suitable liquid continuous phase suitable for dispersing graphene can be employed. Examples of suitable organic liquid continuous phases include ketones, such as methyl ethyl ketone, methyl isobutyl ketone, cyclohexanone and N-Methyl-2-pyrrolidone; amides, such as dimethylformamide; sulfoxides, such as dimethyl sulfoxide; alcohols, ethers, esters, hydrocarbons, chlorinated hydrocarbons, and mixtures of any of the above. One of ordinary skill in the art would be able to determine liquid continuous phase compounds suitable for dispersing graphene from any of the sub-genuses listed above.

It may be that the first liquid continuous phase is not compatible with subsequent processing steps, such as the use of a polymer binder and/or fluoropolymer particles subsequently mixed with the graphene, as discussed in more detail below. If so, the first liquid continuous phase can be separated from the graphene after exfoliation and/or treatment with the fluorosilane, but prior to mixing with the incompatible compounds. Alternatively, if the first liquid continuous phase is compatible it can remain as part of the final composition.

By mixing the graphene-comprising particles and fluorosilane compounds in the liquid continuous phase, a dispersion of fluorosilane treated graphene-comprising particles can be formed. Any other desired ingredients can be included in the dispersion, such as solvents or dispersants.

Fluoropolymer Particles

The fluorosilane-treated graphene-comprising particle dispersion can be mixed with a second dispersion comprising fluorocarbon polymers. The second dispersion can be formed by any suitable method. In an embodiment, the second dispersion is formed by combining a fluorocarbon polymer and a second continuous liquid phase. The second continuous liquid phase can comprise any suitable liquid for forming a dispersion of the fluorocarbon polymers, such as any of the organic liquid continuous phase compounds taught herein; and can be the same as or different from the continuous liquid phase used in the graphene-comprising particle dispersion.

The fluorocarbon polymer can be in the form of solid particles that are dispersed in the second continuous liquid phase. Any suitable fluoropolymer particles can potentially be employed, depending on the desired characteristics of the composite composition. Examples of suitable fluoropolymers include fluoroplastic resins, such as polytetrafluoroethylene (PTFE) particles; perfluoroalkoxy polymer resin (PFA) particles; and fluorinated ethylenepropylene copolymers (FEP) particles.

While mixing, the treated graphene-comprising particles can chemically bond or otherwise adhere to the fluoropolymer particle surface. In an embodiment, the fluoropolymer comprises PFA particles to which the fluorosilane-treated graphene-containing particles adhere.

Coating Dispersions

An embodiment of the present disclosure is directed to a coating dispersion and process of making the dispersion. The process can include forming a coating dispersion comprising the fluorosilane-treated graphene/fluorocarbon polymer composites described herein.

The coating dispersion comprises a polymer binder. Any suitable polymer binder which does not negatively affect the coating properties can be employed. Examples of suitable polymer binders include a poly(alkylene carbonate), such as poly(propylene carbonate), poly(ethylene carbonate), poly(butylene carbonate), poly(cyclohexene carbonate); a poly(acrylic acid), an acrylic copolymer, a methacrylic copolymer, a poly(methacrylic acid), and mixtures thereof. Examples of each of the listed polymer binders are well known in the art. The polymer binder can be present in any suitable amount, such as, for example, about 1% to about 20% by weight, or about 5% to about 15%, or about 10%, based on the total weight of solids in the coating dispersion.

The binder can have one or more benefits, such as providing a stable particle suspension prior to and during coating and/or to hold the particles together after solvent is removed but prior to flowing the particles to thereby avoid cracks being formed in the layer.

A plurality of the above described composite particles of the present disclosure can be dispersed in the polymer binder. The composite particles can comprise a fluorosilane-treated graphene-comprising particle and a fluoropolymer particle. The composite particle dispersions are sufficiently stable to enable uniform deposition of graphene/fluoropolymer composite on substrates without significant phase separation during the coating process.

The composite particles can be present in the coating in any suitable amount. In an embodiment, the particles are present in an amount of 50 weight % or more, such as about 70 weight % to about 99 weight %, based on the total weight of the solid in the coating composition. The amount of total solid in the coating composition ranges from about 10 weight % to about 80 weight %, such as 20 weight % to about 70 weight % or about 30 weight % to about 50 weight % of the total weight of the coating composition.

In an embodiment, the coating compositions of the present disclosure can include one or more additional conductive or non-conductive fillers. Examples of suitable fillers include metal particles, metal oxide particles, carbon nanoparticles, and carbon nanotubes. The amount of filler employed may depend on the desired properties of the product being manufactured. Any other desired ingredients can optionally be employed in the coating compositions of the present disclosure, including dispersing agents or solvents. In an embodiment, carbon nanotubes are not used as a filler.

The coating dispersions can be deposited on a substrate by any suitable liquid coating method, such as flow-coating, dip-coating, spin-on coating and spray coating. The coatings can be heated to dry and/or cure the coating materials. In an example, composite coatings have been conveniently made by flow coating, followed by baking at temperatures above the fluoropolymer melting temperature. The resulting uniform graphene/fluoropolymer composite coatings can be electrically conductive, thermally conductive and/or mechanically robust. Further, the low surface energy property derived from PFA is not substantially negatively affected.

In an embodiment, the binder is a sacrificial binder, meaning that some or all of the binder is removed during subsequent processing. For example, the binder can be removed by heating to temperatures that are high enough to thermally decompose the binder. The decomposition temperatures chosen can depend on the particular binder material used as well as the melting temperatures of the materials employed for the composite particles, among other things. For example, the PFA in graphene/PFA composite particles may melt at temperatures of about 260° C. or higher. Therefore, temperatures high enough to melt and flow the PFA particles while at the same time thermally decomposing the binder can be used, while temperatures that are so high as to significantly decompose the PFA material or damage the substrate can be avoided. Examples of suitable temperatures for a poly(propylene carbonate) binder employed with PFA/graphene composite particles can range from about 260° C. or more, such as about 300° C. to about 360° C., or about 330° C. to about 350° C.

Article of Manufacture

Figure 3:
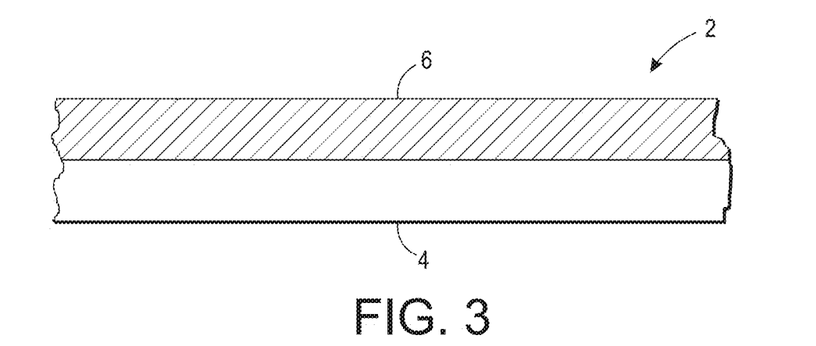
FIG. 3 illustrates an article of manufacture comprising a graphene-comprising particle/fluoropolymer composite layer, according to an embodiment of the present disclosure.

FIG. 3 illustrates an article of manufacture 2 comprising a substrate 4; and a composite layer 6 formed on the substrate. The composite layer 6 is formed by depositing a coating composition comprising a plurality of composite particles dispersed in a polymer binder. As discussed herein, the composite particles comprise a fluorosilane-treated graphene-comprising particle and a fluoropolymer particle.

The substrate 4 over which the composite layer is coated can be any suitable substrate. Examples of substrate materials include glass, semiconductors, such as silicon or gallium arsenide, metals, ceramics, plastics and combinations thereof.

After depositing the coating composition on substrate 4, one or more heating steps are carried out to remove the liquid continuous phase fluids, thermally decompose and remove the binder and flow the fluoropolymer particles. Any of the methods discussed herein for heating and flowing the composite particles can be employed. The resulting composite layer 6 comprises graphene-comprising particles and the flowed fluoropolymer.

The plurality of composite particles, or the flowed layer material from the composite particles, can be present in layer 6 in any desired amount. Example concentrations range from about 70 weight % to about 99 weight %, based on the total weight of the coating. Composite layer 6 can have any suitable thickness. Examples of suitable thickness include thicknesses ranging from about 5 microns to about 100 microns, such as about 10 microns to about 50 microns, or about 15 microns to about 35 microns.

In an embodiment, the article of manufacture 2 is a printing device component. The phrase "printing device" as used herein encompasses any apparatus, such as a digital copier, bookmaking machine, facsimile machine, multi-function machine, and the like, which performs a print outputting function for any purpose. In an embodiment, the article of manufacture 2 is a xerographic printing device component. Examples of xerographic printing device components in which the composite compositions of the present disclosure may be used include fuser members (sometimes referred to in the art as fixing members), pressure rollers and release agent donor members.

Figure 4:
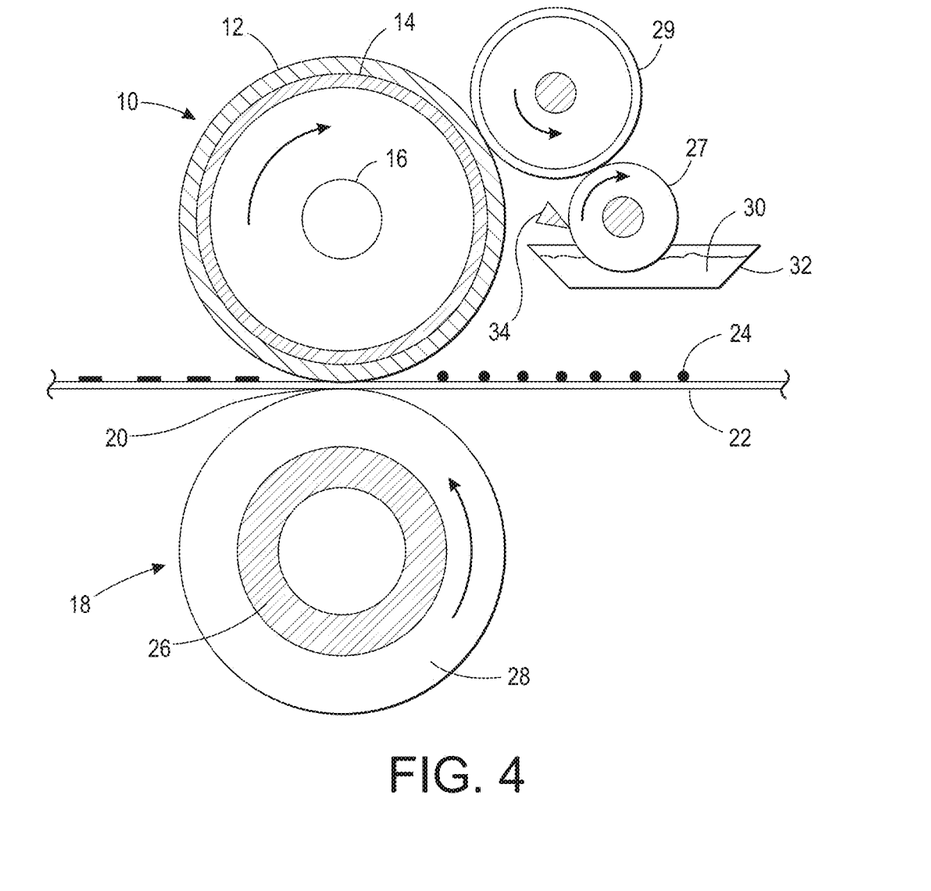
FIG. 4 illustrates a schematic view of a fuser system, according to an embodiment of the present disclosure.

An example fuser member is described in conjunction with a fuser system as shown in FIG. 4, where the numeral 10 designates a fuser roll comprising an outer layer 12 upon a suitable substrate 14. The substrate 14 can be a hollow cylinder or core fabricated from any suitable metal such as aluminum, anodized aluminum, steel, nickel, copper, and the like. Alternatively, the substrate 14 can be a hollow cylinder or core fabricated from non-metallic materials, such as polymers. Example polymeric materials include polyamide, polyimide, polyether ether ketone (PEEK), Teflon/PFA, and the like, and mixtures thereof, which can be optionally filled with fiber such as glass, and the like. In an embodiment, the polymeric or other core material may be formulated to include carbon nanotubes. Such core layers can further increase the overall thermal conductivity of the fuser member. In an embodiment, the substrate 14 can be an endless belt (not shown) of similar construction, as is well known in the art.

Referring again to FIG. 4, the substrate 14 can include a suitable heating element 16 disposed in the hollow portion thereof, according to an embodiment of the present disclosure. Any suitable heating element can be employed. Suitable heating elements are well known in the art.

Backup or pressure roll 18 cooperates with the fuser roll 10 to form a nip or contact arc 20 through which a copy paper or other substrate 22 passes, such that toner images 24 on the copy paper or other substrate 22 contact the outer layer 12 of fuser roll 10. As shown in FIG. 4, the backup roll 18 can include a rigid steel core 26 with a soft surface layer 28 thereon, although the assembly is not limited thereto. Sump 30 contains a polymeric release agent 32 which may be a solid or liquid at room temperature, but is a fluid at operating temperatures.

In an embodiment of FIG. 4 for applying the polymeric release agent 32 to outer layer 12, two rotatably mounted release agent delivery rolls 27 and 29 are provided to transport release agent 32 from the sump 30 to the fuser roll surface. As illustrated, roll 27 is partly immersed in the sump 30 and transports on its surface release agent from the sump to the delivery roll 29. By using a metering blade 34, a layer of polymeric release fluid can be applied initially to delivery roll 29 and subsequently to the outer layer 12 of the fuser roll 10 in a controlled thickness ranging from submicrometer thickness to thickness of several micrometers of release fluid. Thus, by metering device 34 a desired thickness, such as about 0.1 micrometers to 2 micrometers or greater, of release fluid can be applied to the surface of outer layer 12.

The design illustrated in FIG. 4 is not intended to limit the present disclosure. For example, other well known and after developed electrostatographic printing apparatuses can also accommodate and use the fuser members described herein. For example, some embodiments do not apply release agent to the fuser roll surface, and thus the release agent components can be omitted. In other embodiments, the depicted cylindrical fuser roll can be replaced by an endless belt fuser member. In still other embodiments, the heating of the fuser member can be by methods other than a heating element disposed in the hollow portion thereof. For example, heating can be by an external heating element or an integral heating element, as desired. Other changes and modifications will be apparent to those in the art.

As used herein, the term "fuser" member, and variants thereof, may be a roll, belt such as an endless belt, flat surface such as a sheet or plate, or other suitable shape used in the fixing of thermoplastic toner images to a suitable substrate. It may take the form of a fuser member, a pressure member or a release agent donor member.

In an embodiment, the outer layer 12 comprises any of the graphene-comprising/fluoropolymer composite compositions of the present disclosure. In an embodiment, the graphene-comprising particle/fluoropolymer composite materials can be chosen to provide properties that are suitable for fuser applications. For example, the fluoropolymer can be a heat stable elastomer or resin material that can withstand elevated temperatures generally from about 90° C. up to about 200° C., or higher, depending upon the temperature desired for fusing the toner particles to the substrate.

In an embodiment, there may be one or more intermediate layers between the substrate 14 and the outer layer 12. Typical materials having the appropriate thermal and mechanical properties for such intermediate layers include silicone elastomers, fluoroelastomers, EPDM (ethylene propylene hexadiene), and Teflon™ (i.e., polytetrafluoroethylene) such as Teflon PFA sleeved rollers. Examples of designs for fusing members known in the art and are described in U.S. Pat. Nos. 4,373,239; 5,501,881; 5,512,409 and 5,729,813, the entire disclosures of which are incorporated herein by reference.

EXAMPLES

The following examples are directed to a graphene-comprising particle/PFA composite, wherein the graphene-comprising particles are fluorosilane-treated graphene platelets. More specifically, this composite material is made from a solution-based formulation containing PFA particles and graphene platelets which are fluorosilane-treated and have affinity with PFA particles. As discussed in more detail below, the graphene platelets are first exfoliated by sonication of a graphene-liquid continuous phase (e.g., cyclohexanone) dispersion containing fluorosilane. The uniform dispersion is then mixed with PFA dispersion (e.g., a flow-coatable PFA formulation). While mixing, the exfoliated graphene platelets adhere to the PFA particle surface.

All percentages in the examples below are percent by weight, unless otherwise specified.

Example 1

Figure 2A:
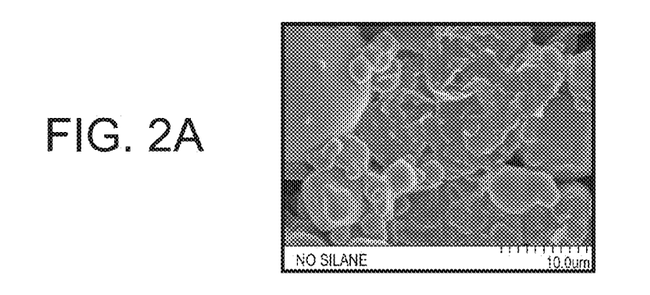
FIGS. 2A to 2C show SEM analysis of untreated (FIG. 2A) and fluorosilane-treated (FIGS. 2B and 2C) graphene platelet/PFA mixtures.
Figure 2B:
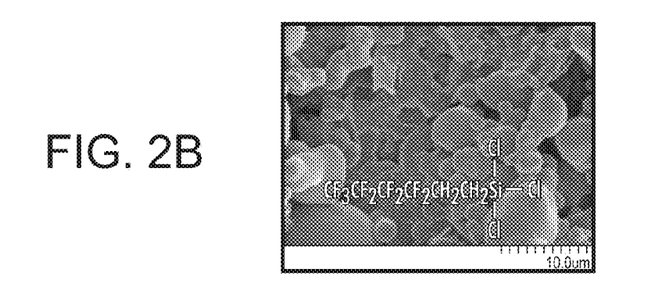

Graphene surface treatment with fluorosilanes was carried out to develop a composition of the graphene/PFA composite with improved uniformity. To this end, graphene platelets in dry powder form were treated with several different fluorosilane coupling agents, including (3,3,3-trifluoropropyl)trichlorosilane; nonafluoro-1,1,2,2-tetra-hydrohexyl) trichlorosilane; pentafluorophenylpropyl trichlorosilane and (tridecafluoro-1,1,2,2-tetra-hydrooctyl)trichlorosilane. SEM analysis was performed on samples without silane treatment (FIG. 2A), a sample treated with (nonafluoro-1,1,2,2-tetrahydrohexyl) trichlorosilane (FIG. 2B) and a sample treated with (tridecafluoro-1,1,2,2-tetra-hydrooctyl)trichlorosilane (FIG. 2C).

Figure 2C:
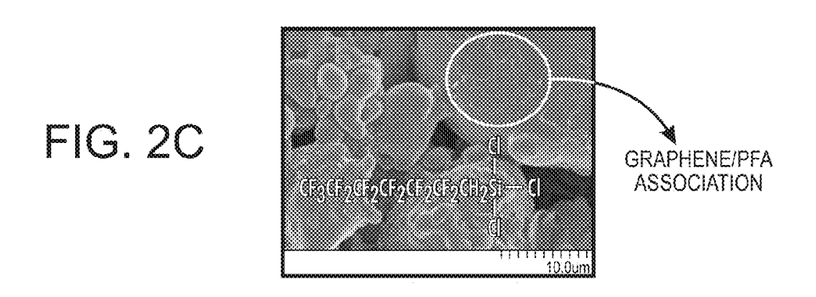
Figure 2D:
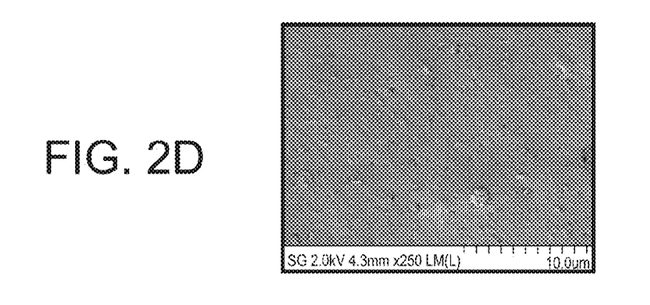
FIG. 2D shows a uniform, defect-free composite coating that was fabricated from a coating formulation using graphene/PFA dispersion of FIG. 2C, according to an embodiment of the present disclosure.

Results showed that the fluorosilane-treated graphene/PFA coating dispersion of FIG. 2C formed a homogeneous coating formulation. The dispersions with untreated-graphene/PFA and the sample treated with (nonafluoro-1,1,2,2-tetra-hydrohexyl) trichlorosilane both found phase separation. However, the (nonafluoro-1,1,2,2-tetra-hydrohexyl) trichlorosilane treated graphene samples showed improved dispersion stability compared to the untreated sample. As shown in FIG. 2D, a uniform, defect-free composite coating was fabricated from the homogeneous coating formulation of FIG. 2C.

Examples 2A and 2B

Composite Dispersion Preparation

Example 2A—Graphene surface treatment: 0.6 g (0.5%) graphene (STREM 06-0210) was dispersed in 120 g cyclohexanone (CHN) solution containing 0.6 g (tridecafluoro-1,1,2,2-tetra-hydrooctyl)trichlorosilane (Gelest, SIT8174.0) by sonication for 2 hours with 60% output. A 3% by weight graphene dispersion was obtained by removing the excessive liquid continuous phase and fluorosilane by centrifuging.

Example 2B—2% Graphene/PFA composite dispersion: 9 g PFA (Dupont MP320) powder was dispersed in 8 g methyl ethyl ketone (MEK) and 3 g CHN with 0.36 g GF400 solution (25%) with sonication for 30 minutes with 60% power output. Then 6 g of the graphene dispersion of Example 2A containing 3% of fluorosilane treated graphene was added to the PFA/MEK dispersion with sonication for another 30 minutes. 3.8 g solution of poly(propylene carbonate) (PPC, Empower QPAC®40) in CHN (20%) was added to the composite dispersion with rolling to form a uniform coating dispersion containing 2% of graphene.

Example 3

Composite Coating Preparation

A composite coating was produced by application of the 2% graphene/PFA composite dispersion of Example 2B onto a silicone rubber substrate by draw-down coating and followed by baking in an oven for 15 minutes at 340° C.

The above Graphene/PFA composite composition contained fluorosilane-treated graphene. The fluorosilane-treated graphene platelets adhered to the PFA particles. The coatings derived from the homogeneous solution-based graphene/PFA coating formulation of Example 2A, which contained a transient binder of poly(alkylene carbonates), were relatively uniform and possessed high electrical and thermal conductivity.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A composition, comprising:
   a liquid continuous phase; and
   a plurality of composite particles dispersed in the liquid continuous phase, the composite particles each comprising a fluorosilane-treated graphene-comprising particle and a fluoropolymer particle.

2. The composition of claim 1, wherein the composition further comprises a sacrificial polymeric binder.

3. The composition of claim 2, wherein the sacrificial polymer binder is selected from the group consisting of a poly(alkylene carbonate), a poly(acrylic acid), an acrylic copolymer, a methacrylic copolymer, a poly(methacrylic acid), and mixtures thereof.

4. The composition of claim 1, wherein the fluorosilane-treated graphene-comprising particle is made by treating a graphene-comprising particle with a trichlorosilane compound comprising a linear fluoroalkyl substituent having at least 6 carbon atoms that are substituted with fluorine.

5. The composition of claim 1, wherein the fluorosilane-treated graphene-comprising particles are selected from the group consisting of fluorosilane-treated graphene, fluorosilane-treated graphene platelets and mixtures thereof.

6. The composition of claim 1, wherein the composite particles are present in an amount ranging from about 50 weight % to about 99 weight %, based on the total weight of the solid in the composition.

7. The composition of claim 1, wherein the total solid ranges from about 10 weight % to about 80 weight % of the total weight of the composition.

8. The composition of claim 1, wherein the fluoropolymer particle is a fluoroplastic resin.

9. The composition of claim 8, wherein the fluoroplastic resin is selected from the group consisting of polytetrafluoroethylene (PTFE); perfluoroalkoxy polymer resin (PFA); and fluorinated ethylenepropylene copolymers (FEP).

10. A process for making a fluorosilane-treated graphene/fluorocarbon polymer composite, the process comprising:
    mixing graphene-comprising particles, a fluorosilane compound and a first liquid continuous phase to form a fluorosilane-treated graphene-comprising particle dispersion; and
    mixing the fluorosilane-treated graphene-comprising particles with a fluorocarbon polymer dispersion to form a dispersion of composite particles comprising fluorosilane-treated graphene-comprising particles adhered to fluorocarbon polymer particles in a second liquid continuous phase.

11. The process of claim 10, wherein the graphene-comprising particles are selected from the group consisting of graphene, graphene platelets, graphene nanosheets and mixtures thereof.

12. The process of claim 10, wherein the fluorosilane is selected from the group consisting of (3,3,3-trifluoropropyl) trichlorosilane, nonafluorohexyl trichlorosilane, nonafluorohexyl trimethoxysilane, nonafluorohexyl trialkoxysilane, pentafluorophenylpropyl trichlorosilane, pentafluorophenylpropyl trimethoxysilane, pentafluorophenylpropyl trialkoxysilane, (tridecafluoro-1,1,2,2-tetra-hydrooctyl)trichlorosilane, (tridecafluoro-1,1,2,2-tetra-hydrooctyl)trialkoxysilane, perfluoroalkylethyltriethoxysilanes, (tridecafluoro-1,1,2,2-tetra-hydrooctyl)trichlorosilane, (3,3,3-trifluoropropyl)trialkoxysilane, perfluorododecyl-1H,1H,2H,2H-triethoxysilane, p-trifluoromethyltetrafluorophenyltriethoxysilane, and mixtures thereof.

13. The process of claim 10, wherein the fluorosilane compound is a trichlorosilane compound comprising a linear fluoroalkyl substituent having at least 6 carbon atoms that are substituted with fluorine.

14. The process of claim 10, wherein the first liquid continuous phase comprises a compound selected from the group consisting of ketones, amides, sulfoxides, alcohols, ethers, esters, hydrocarbons, chlorinated hydrocarbons and mixtures thereof.

15. The process of claim 10, wherein the second liquid continuous phase comprises a compound selected from the group consisting of ketones, amides, sulfoxides, alcohols, ethers, esters, hydrocarbons, chlorinated hydrocarbons and mixtures thereof.

16. A process of making a coated article comprising
mixing graphene-comprising particles, a fluorosilane compound and a first liquid continuous phase to form a fluorosilane-treated graphene-comprising particle dispersion;
mixing the fluorosilane-treated graphene-comprising particles with a fluorocarbon polymer dispersion to form a dispersion of composite particles comprising fluorosilane-treated graphene-comprising particles adhered to fluorocarbon polymer particles in a second liquid continuous phase;
mixing a sacrificial polymer binder with the dispersion of composite particles;
coating the mixture onto a substrate;
and heating the coated mixture to a temperature and for a time period that is sufficient to thermally decompose the sacrificial polymer binder.

17. The process of claim 16, wherein the sacrificial polymer binder is selected from the group consisting of a poly(alkylene carbonate), a poly(acrylic acid), an acrylic copolymer, a methacrylic copolymer, a poly(methacrylic acid), and mixtures thereof.

18. An article comprising:
a substrate; and
a composite layer formed on the substrate, the composite layer comprising a plurality of fluorosilane-treated graphene-comprising particles and a fluorocarbon polymer.

19. The article of claim 18, wherein the article is a xerographic component selected from the group consisting of a fuser member, a pressure roller and a release agent donor member.

20. The article of claim 18, wherein the fluorosilane-treated graphene-comprising particles are made by treating a graphene-comprising particle with a trichlorosilane compound comprising a linear fluoroalkyl substituent having at least 6 carbon atoms substituted with fluorine.

* * * * *